Feb. 28, 1939.    E. M. CLAYTOR    2,148,804
ELECTRICAL SYSTEM FOR WIND DRIVEN GENERATORS
Filed Feb. 23, 1938

INVENTOR
Edward M. Claytor
BY
Spencer Hardman & Fehr
his ATTORNEYS

Patented Feb. 28, 1939

2,148,804

UNITED STATES PATENT OFFICE 2,148,804

ELECTRICAL SYSTEM FOR WIND DRIVEN GENERATORS

Edward M. Claytor, Anderson, Ind., assignor to General Motors Corporation, Detroit, Mich., a corporation of Delaware Application February 23, 1938, Serial No. 191,938

4 Claims. (Cl. 290—44)

This invention relates to the generation of electricity by a generator driven by a wind wheel or a wind operated propeller.

It is an object of the invention to control the load on the generator in accordance with the power of the wind operating the propeller. More particularly it is an object to absorb a large amount of power from the propeller at high wind velocity and to economically absorb less power at low wind velocity. Since the power to be derived from a wind operated propeller varies as the cube of the velocity of the wind, it is evident that the most economical system is one in which the load on the generator is controlled in accordance with wind velocity. When the wind velocity is low, the loading of the generator should be low, otherwise the propeller would be prevented from obtaining an efficient speed. At high wind velocity the load on the generator should be increased in order to prevent the propeller from running away in high winds, and in order to take advantage of the increase in power.

In order to accomplish this object, the present invention provides for automatically changing the loading of the generators from one storage battery or group of cells to a plurality of batteries. A single battery or group of cells is used when the wind velocity is low. At a predetermined higher wind velocity, a wind operated switch controls a circuit which effects the connection of the generator with a plurality of batteries in series. In this way the generator is loaded to prevent the propeller from attaining an excessive speed in a high wind; and a plurality of batteries are provided for absorbing the excess energy of the generator.

Further objects and advantages of the present invention will be apparent from the following description, reference being had to the accompanying drawing wherein a preferred embodiment of the present invention is clearly shown.

Figure 2:
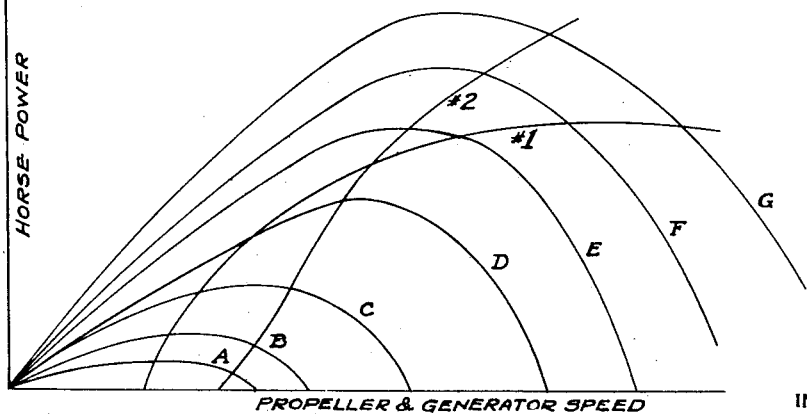
Fig. 2 is a chart of curves illustrating the operation of the present invention.

Referring to Fig. 2, the base or horizontal line represents propeller and generator speed, and the vertical line represents horsepower. The various curves from A, B, etc., to G are horsepower output curves of the propeller for various air velocities. Curve No. 1 represents the generator input when charging one battery. Curve No. 2 represents the generator input when charging two batteries. The points where the curves 1 and 2 cross curves A, B, C, etc., are stable operating points. Curve No. 1 shows the power that the generator can absorb from the propeller when the generator is charging one battery. When the wind velocities are relatively low the propeller will deliver power illustrated by curves A, B and C. It should be noted that these curves are intersected near their maximum values by curve No. 1. This shows economic operation because the generator absorbs almost all of the peak power developed by the propeller.

If the wind velocity is increased more and more, causing the propeller to deliver greater output, as shown by curves D, E, F, G, etc., the generator absorbing ability, with one battery, is insufficient to take the peak power. As a result the point of operation is on the negative slope portion of the propeller output curves representing high speed operation and low power absorption.

If more than one battery is placed on charge connected in series, when the wind velocity reaches curve D, the new power absorbing curve No. 2 will intersect D near its peak. This holds true for wind velocities much higher than that represented by D, viz., velocities represented by curves E, F and G.

These curves have been substantiated by a test model and clearly indicate that more power can be absorbed over the whole range of wind velocities when the power absorbing ability of the generator is increased by increasing the number of batteries in series on charge.

Figure 1:
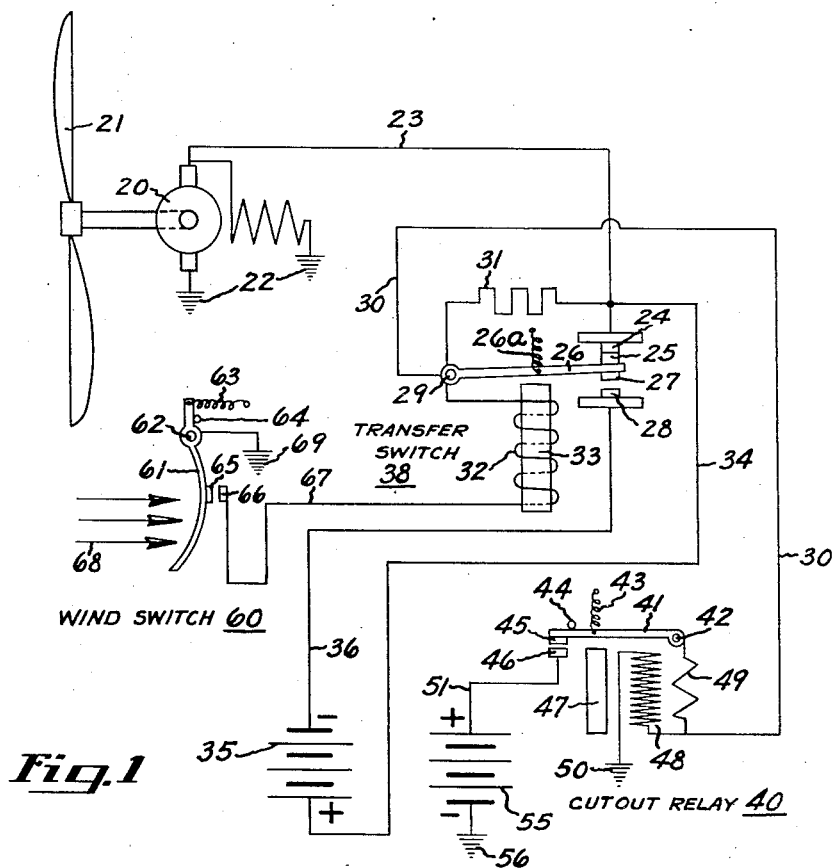
Fig. 1 is a wiring diagram of an electrical circuit involving the present invention.

The means for automatically controlling the load of the generator in conformity with variations in wind velocity will now be described in reference to Fig. 1. In Fig. 1, 20 designates a generator driven by the wind wheel or propeller 21. One end of the shunt field of the generator and one of its brushes are grounded at 22. The other brush is connected by a wire 23 with a switch contact 24 engageable with a movable contact 25 mounted on the upper side of an armature 26, the lower side of which carries a contact 27 engageable with a fixed contact 28. The armature 26 is pivoted at 29, and is there connected with a wire 30, resistance 31 and a magnet coil 32. Coil 32 surrounds a core 33 magnetically related to armature 26. Resistance 31 is connected to the wire 23 and to a wire 34 connected to one terminal of a storage battery 35 having its other terminal connected by wire 36 with contact 28. The wire 30 is contacted with a cut-out relay 40 comprising an armature 41 pivoted at 42 and urged by a spring 43 against a stop 44 and carrying a contact 45 engageable with a contact 46.

Armature cooperates with a magnetizable core 47 surrounded by two magnet coils, namely, coil 48 which is an armature attracting coil, and 49 which is an armature holding coil. Coil 48 is grounded at 50. Contact 46 is connected by wire 51 with a storage battery 55 grounded at 56.

The parts 24, 29, 32 and 33 constitute a transfer switch 38 which either connects battery 55 alone with the generator or connects battery 55 in series 35 with the generator 20. The transfer switch 38 is controlled by a wind switch 60 which comprises a paddle or vane 61, pivoted at 62, and urged by a spring 63 against a stop 64. Vane 61 carries a contact 65 engageable with a contact 66 connected by wire 67 with the magnet coil 32 of transfer switch 38. Arrows 68 designate a current of wind which impinges upon the vane 61. At relatively low wind velocity, the switch contacts 65 and 66 are held open by the spring 63. While the wind switch is open, the transfer switch will be in the condition shown in Fig. 1 in which the battery 55 only is connected with the generator 20 and the cut-out relay through the following circuit: generator 20, grounded at 22, wire 23, contact 24, contact 25, armature 26, wire 30, coil 49, armature 41, contact 45, contact 46, wire 51, battery 55 and ground 56. It will be understood that thereby armature 41 is attracted to circuit closing position by magnet coil 48 which becomes energized to affect the closing of contacts 45 and 46 when the generator voltage has attained a certain value.

When the velocity of the wind impinging upon the vane 61 has attained a certain value, the resistance of the spring 63 will be overcome, thereby permitting the contact 65 to engage the contact 66. When this occurs the magnet coil 32 of the transfer switch 38 will be energized through the following circuit: generator 20, grounded at 22, wire 23, contact 24, contact 25, armature 26, coil 32, wire 67, contact 66, contact 65, pivot 62 and ground connection 69. Coil 32 being energized, armature 26 will be attracted toward core 33, thereby separating contact 25 from contact 24, and bringing contact 27 into engagement with contact 28. At the instant of separation of contact 27 from contact 25, there is a momentary rise of generator voltage which is fed through resistor 31 to the shunt coil 48 of the cutout relay 40 during the time the armature 26 of the transfer switch 38 is operating. This prevents the cutout relay from opening while the transfer switch armature 26 moves from contact 24 to contact 28.

The resistor 31 prevents short circuit of battery 35 and has practically the same amount of resistance as magnet coil 48 which is across battery 55 during charge.

The closing of contacts 27 and 28 and the separation of the contacts 24 and 25 causes both batteries 35 and 55 to be connected within series with the ground through the following circuit: generator 20, grounded at 22, wire 23, wire 34, battery 35, wire 36, contact 28, contact 27, armature 26, wire 30, cutout relay 40, wire 51, battery 55 and ground connection 56. In this manner the wind switch 60, which is affected by the same breeze which operates the propeller 21, acts through the transfer switch 38 to change the generator out-put from that represented by curve No. 1 of Fig. 2, to the out-put represented by curve No. 2, when the wind velocity has attained a certain value.

When the wind velocity decreases below a certain value the wind switch 60 will open, and the transfer switch will be restored to normal position shown in Fig. 1, by a spring 26a which biases the armature 26 upwardly.

The field coil of the generator in this system is liberally designed to withstand the increased loss in it when charging more batteries in series.

While the embodiment of the present invention as herein disclosed, constitutes a preferred form, it is to be understood that other forms might be adopted, all coming within the scope of the claims which follow.

What is claimed is as follows:

1. An electrical system for wind driven generators comprising, a wind propeller operated generator, a plurality of batteries of storage cells, and control means responsive to wind velocity for connecting a lower number of battery cells with the generator at relatively low wind velocity and a higher number of battery cells in series with the generator at higher wind velocity.

2. An electrical system according to claim 1 in which the control means includes a transfer switch for including a lesser or a greater number of battery cells in series with the generator, and a wind operated switch for controlling the operation of the transfer switch.

3. An electrical system according to claim 1 in which a cut-out relay is in circuit between the generator and storage battery and in which a circuit is provided for keeping a voltage on the cut-out relay while changing connections from a lower number to a higher number of storage battery cells.

4. An electrical system according to claim 1 in which the control means includes an electromagnetically operated transfer switch for including a lesser or a greater number of battery cells in series with the generator, and a wind operated switch for controlling the energization of the magnet of the transfer switch.

EDWARD M. CLAYTOR.